_United States Patent_ [19]

Jannic

[11] Patent Number: 5,019,605

[45] Date of Patent: May 28, 1991

[54] LOW DENSITY, SELF-EXTINGUISHING EPOXIDE COMPOSITION

[75] Inventor: Patrice Jannic, Rueil-Malmaison, France

[73] Assignee: Minnesota Mining and Manufacturing Company, St. Paul, Minn.

[21] Appl. No.: 324,237

[22] Filed: Mar. 15, 1989

[51] Int. Cl.$^5$ .......................... C08L 63/00; C08K 7/28; C08K 7/26; C08K 7/22

[52] U.S. Cl. .................................... 523/219; 523/218; 523/445; 523/451; 523/457

[58] Field of Search ............... 523/218, 219, 445, 457, 523/451

[56] References Cited

U.S. PATENT DOCUMENTS

| | | | |
|---|---|---|---|
| 2,978,340 | 4/1961 | Franklin et al. | 106/40 |
| 3,018,262 | 1/1962 | Schroeder | 260/29.2 |
| 3,117,099 | 1/1964 | Proops et al. | 260/18 |
| 3,373,135 | 3/1968 | Jenkner et al. | 523/451 |
| 3,445,436 | 5/1969 | Lake et al. | 260/75 |
| 3,472,798 | 10/1969 | Pitchforth et al. | 260/2.5 |
| 3,615,972 | 10/1971 | Morehouse et al. | 156/79 |
| 3,677,999 | 7/1972 | Denk et al. | 523/457 |
| 3,740,359 | 6/1973 | Garner | 260/2.5 B |
| 3,775,355 | 11/1973 | Jellinek et al. | 523/445 |
| 3,945,956 | 3/1976 | Garner | 260/2.5 B |
| 4,075,138 | 2/1978 | Garner | 260/2.5 B |
| 4,279,632 | 7/1981 | Frosch et al. | 65/21.4 |
| 4,421,562 | 12/1983 | Sands | 106/75 |
| 4,637,990 | 1/1987 | Torobia | 502/10 |
| 4,668,718 | 5/1987 | Schreiber | 523/451 |
| 4,744,831 | 5/1988 | Beck | 106/288 |
| 4,772,495 | 9/1988 | Headrick | 523/219 |
| 4,772,511 | 9/1988 | Wood et al. | 428/325 |

_Primary Examiner_—Lewis T. Jacobs
_Attorney, Agent, or Firm_—Gary L. Griswold; Walter N. Kirn; James V. Lilly

[57] ABSTRACT

A low density self-extinguishing epoxide composition employing an epoxide, an epoxide hardener, a smoke suppressant and a low density filler is provided. The composition contains from 3 to 10 weight percent bromine.

36 Claims, No Drawings

LOW DENSITY, SELF-EXTINGUISHING EPOXIDE COMPOSITION

TECHNICAL FIELD

This invention relates to low density, self-extinguishing compositions.

BACKGROUND ART

Low density, fire-resistant compositions are known. They are often used in applications where light weight is needed. For example, the aerospace industry employs such compositions in the manufacture of panels or walls used in aircraft interiors.

In order to be truly useful in these applications it is necessary that these compositions (1) be fire-resistant and preferably self-extinguishing, (2) have substantially reduced smoke emission from decomposition or combustion in the presence of flame or a heat source, and (3) be capable of withstanding the forces encountered when used at the interface of a pressurized and non-pressurized zone.

DISCLOSURE OF THE INVENTION

A novel low density composition which achieves the above-identified properties has been discovered. This composition, which is based upon an epoxide material, is self-extinguishing, has excellent compressive strength and excellent adhesion to various substrates. The composition comprises an organic epoxide compound having an epoxide-functionality of at least one, a hardener for the epoxide, a smoke suppressant, a low density filler, and contains from about 3 to about 10 weight percent bromine. It can be provided in a variety of forms. For example, it may be supplied as a one-part or a two-part paste, a film, or a prepreg used to manufacture a composite part. The composition may be provided in still other forms as will be understood to those of skill in the art.

The composition may be used in a variety of ways. For example, it may be employed as a void filling compound in applications where low density and high strength are needed (e.g., bridge construction, ship construction, aerospace construction and the like). In other applications, it may be used as a low density protective coating for various surfaces, a composite matrix resin, an adhesive and the like. In still other applications, it may be used as a caulking and sealing material, a casting and molding compound, a potting and encapsulating compound and the like.

In the more preferred aspect of the invention, the composition also provides smoke suppression. Moreover, after being hardened, the composition preferably has a compressive strength of at least 15 Newtons per square millimeter (N/mm$^2$) at ambient temperature (15°-25° C). Even more preferably the hardened sample has a compressive strength of at least 7 N/mm$^2$ at 80° C.

Additionally, hardened samples of the invention preferably also possesses:

a) a non-flaming smoke density of less than about 100 after 90 seconds, and less than about 200 after 240 seconds; and
b) a flaming smoke density of less than about 100 after 90 seconds, and less than about 200 after 240 seconds;

The hardened samples still further preferably exhibit the following characteristics:

c) with the sample held in a vertical position during a 60 second ignition test;
  i) a burn rate of less than 150 mm;
  ii) a flame time of less than 15 seconds; and
  iii) a drip flame time of less than 3 seconds; and
d) with the sample held in a horizontal position during a 12 second ignition test;
  i) a burn rate of less than 200 mm;
  ii) a flame time of less than 15 seconds; and
  iii) a drip flame time of less than 5 seconds.

In a particularly preferred aspect of the invention, hardened samples of the invention evolve very little toxic gas when subjected to flame. Preferably they evolve a level of HCN of less than 150 parts per million (ppm) and more preferably less than 2 ppm; a level of CO of less than 3500 ppm and more preferably less than 300 ppm; a combined level of NO and NO$_2$ of less than 100 ppm and more preferably less than 3 ppm; a level of SO$_2$ of less than 100 ppm and more preferably less than 10 ppm; a level of HF of less than 50 ppm and more preferably less than 5 ppm, and even more preferably zero; and a level of HCl of less than 500 ppm and more preferably less than 4 ppm.

The values are determined according to the test procedures described in Airbus Technical Specification (ATS) 1000.001 (Chapter 7) and FAR 25853 (a) and (b).

As used herein the following terms have the following meaning:

"low density" means a composition which has a weight/volume (sometimes referred to herein as density) of 1 g/cm or less;

"self extinguishing" means that a cured or hardened specimen of the composition will either not burn at all when subjected to heat or flame or stops burning within 15 seconds or less after removal of the heat or flame.

DETAILED DESCRIPTION

Organic epoxide compounds useful in the compositions of the invention are any organic compounds having an oxirane ring polymerizable by ring opening. Such materials, broadly called epoxides, include monomeric epoxy compounds and epoxides of the polymeric type and can be aliphatic, cycloaliphatic, aromatic or heterocyclic. These materials generally have at least one polymerizable epoxy group per molecule, preferably two or more epoxy groups per molecule and, in the polymeric type there may be many pendent epoxy groups (e.g., a glycidyl methacrylate polymer could have several thousand pendent epoxy groups per average molecular weight). Most preferably these materials have from two to four polymerizable epoxy groups per molecule.

These epoxy-containing materials may vary from low molecular weight monomeric materials to high molecular weight polymers and may vary greatly in the nature of their backbone and substituent groups. For example, the backbone may be of any type, and substituent groups thereon can be any group not having a nucleophilic group or electrophilic group (such as an active hydrogen atom) which is reactive with an oxirane ring. Illustrative of permissible substituent groups are halogens, ester groups, ethers, sulfonate groups, siloxane groups, nitro groups, amide groups, nitrile groups, phosphate groups, etc. The molecular weight of the epoxy-containing materials may vary from 58 to about 100,000 or more. Mixtures of various epoxy-containing materials can also be used in the compositions of this invention.

Such epoxy-containing materials are well known and include such epoxides as epichlorohydrins (e.g. epichlorohydrin); alkylene oxides (e.g., propylene oxide, styrene oxide); alkenyl oxides (e.g., butadiene oxide); glycidyl esters (e.g., ethyl glycidate); glycidyl-type epoxy resins (e.g., the diglycidyl ethers of Bisphenol A and of novolac resins, such as described in "Handbook of Epoxy Resins" by Lee and Neville, McGraw-Hill Book Co., New York (1967)).

Other useful epoxy-containing materials which can be used in this invention are those which contain one or more cyclohexene oxide groups such as the epoxycyclohexanecarboxylates, typified by 3,4-epoxycyclohexylmethyl -3,4-epoxycyclohexanecarboxylate; 2,4-epoxy-2-methylcyclohexylmethyl-3,4-epoxy-2-methyl-cyclohexanecarboxylate; and bis(3,4-epoxy-6-methyl-cyclohexylmethyl)adipate. For a more detailed list of useful epoxies of this nature, reference is made to the U.S. Pat. No. 3,117,099, incorporated herein by reference.

Further epoxy-containing materials which are particularly useful in the practice of this invention include glycidyl ether monomers of the formula

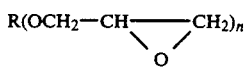

where R is alkyl or aryl and n is an integer of 1 to 6, preferably from 2 to 4. Examples are the glycidyl ethers of polyhydric phenols obtained by reacting a polyhydric phenol with an excess of chlorohydrin such as epichlorohydrin (e.g., the diglycidyl ether of 2,2-bis-(2,3-epoxy propoxyphenol)-propane). Further examples of epoxides of this type which can be used in the practice of this invention are described in U.S. Pat. No. 3,018,262, incorporated herein by reference.

There are a host of commercially available epoxy-containing materials which can be used in this invention. In particular, epoxides which are readily available include propylene oxide, epichlorohydrin, styrene oxide, vinyl cyclohexene oxide, glycidol, glycidylmethacrylate, diglycidyl ether of Bisphenol A (e.g., those available under the trade designations "Epon 828" from Shell Chemical Co., "DER 331", "DER 332", and "DER 334", from Dow Chemical Co.), vinylcyclohexane dioxide (e.g., "ERL-4206" from Union Carbide Corp.), 3,4-epoxycyclohexylmethyl-3,4-epoxycyclohexane carboxylate (e.g., "ERL-4221" from Union Carbide Corp.), 3,4-epoxy-6-methylcyclohexylmethyl-3,4-epoxy-6-methylcyclo hexane carboxylate (e.g., "ERL-4201" from Union Carbide Corp.), bis(3,4-epoxy-6-methylcyclohexylmethyl)adipate (e.g., "ERL-4289" from Union Carbide Corp.), bis(2,3-epoxycyclopentyl)ether (e.g., "ERL-0400" from Union Carbide Corp.), aliphatic epoxy modified with polypropylene glycol (e.g., "ERL-4050" and "ERL-4052" from Union Carbide Corp.), dipentene dioxide (e.g., "ERL-4269" from Union Carbide Corp.), epoxidized polybutadiene (e.g., "Oxiron 2001" from FMC Corp.), fluorinated epoxy resins (e.g., "Epon 1379" from Shell Chemical Company), silicone resin containing epoxy functionality, flame retardant epoxy resins (e.g., "DER-580", a brominated bisphenol type epoxy resin available from Dow Chemical Co.), 1,4-butanediol diglycidyl ether (e.g., "Araldite RD-2" from Ciba-Geigy), polyglycidyl ether of phenolformaldehyde novolac (e.g., "DEN-431" and "DEN-438" from Dow Chemical Co.), and resorcinol diglycidyl ether (e.g., "Kopoxite" from Koppers Company, Inc.).

Still other useful epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Still other useful epoxy-containing materials are the polyurethane polyepoxides which are obtained by reacting an organic polyisocyanate with a triol or a mixture of a triol and diol to form an isocyanate terminated polyurethane prepolymer and reacting the prepolymer with a hydroxy aliphatic epoxide compound. Further examples of epoxy-containing material of this type which can be used in the practice of this invention are described in U.S. Pat. No. 3,445,436, incorporated herein by reference.

Typically the organic epoxide is present at a level of from about 10 to 75 weight percent of the composition. Preferably the composition comprises from 15–25 percent by weight of the organic epoxide.

Epoxy hardeners useful in the invention are materials which react with the oxirane ring of the organic epoxide causing substantial cross-linking of the epoxide. These materials contain at least one nucleophilic or electrophilic group (such as an active hydrogen atom) which causes the cross linking reaction to take place.

Hardeners are distinct from epoxy chain extension agents which primarily become lodged between chains of the organic epoxide and cause little, if any, cross-linking. Epoxy hardeners as used herein are also known in the art as curing agents, catalysts, epoxy curatives, and curatives.

Epoxy hardeners useful in the invention include those conventionally used for curing epoxy resin compositions and forming cross-linked polymer networks. Such agents include aliphatic and aromatic primary amines, for example: di-(4-aminophenyl)-sulfone; di-(4-aminophenyl)ethers; and 2,2-bis(4-aminophenyl)propane. Such compounds also include aliphatic and aromatic tertiary amines such as dimethylaminopropylamine and pyridine, which may act as catalysts to generate substantial crosslinking. Further, boron trifluoride complexes such as $BF_3$-monoethanolamine; imidazoles such as 2-ethyl-4-methylimidazole; guanidines such as tetramethyl guanidine; substituted ureas such as toluene diisocyanate urea; and, dicyandiamide are useful as curing agents or catalysts. Still further examples of useful hardeners are acid anhydrides such as the acid anhydrides of 4-methyltetrahydroxyphthalic acid anhydride; 3-methyltetrahydroxyphthalic acid anhydride; and methylnorbornene phthalic acid anhydride. Still other useful hardeners include polyamines, mercaptans and phenols.

The amount of hardener needed in the composition will vary from hardener to hardener and from epoxide to epoxide. However, the hardener is provided in such an amount as to be effective in causing substantially complete hardening of the composition within a desired length of time. For example, the compositions of the invention typically employ from 1 to 25 percent of the hardener.

Preferably the combined epoxide/hardener content employed in the compositions of the invention is in the range of from about 30 to 50 weight percent, more preferably in the range of about 40 to 50 weight percent. The weight ratio of epoxide to hardener preferably is in the range of from about 0.7/1 to 1.5/1.

The choice of hardener has some influence upon the viscosity of the uncured composition. For example, the use of amine based hardeners generally results in a very viscous or heavy paste-like product. As a result, such hardeners are generally used only when a two-part composition is to be provided. On the other hand, some acid anhydride hardeners provide a fluid, paste-like product. As a result, this type of hardener is very useful when a one-part product is desired.

The smoke suppressant used in the invention is a material which, when heated gives off water, typically upon decomposition. Although the mechanism by which the smoke suppressant is not fully understood, it has been discovered that the smoke suppressant permits higher light transmission during burning. The smoke suppressant is an inorganic material which may be selected from a wide variety of materials. For example, alkaline earth metal hydroxides (e.g., the hydroxides of Be, Mg, Ca, Sr, and Ba), aluminum group metal hydroxides (e.g., Al, Ga, In, Tl), boric acid, and mixtures thereof are examples of useful smoke suppressants.

As with the hardener, the choice of smoke suppressant is influenced by the type of product desired (e.g., one-, two-part, etc.) and, to some extent, the epoxide employed. For example, boric acid could be used in a two-part product, although its use is generally less preferred for reasons of lowered product stability and a tendency to interfere with the cure or hardening of the epoxide.

Alkaline earth metal hydroxides and aluminum group hydroxides could be used in either a one- or two-part product. Aluminum group hydroxides, particularly aluminum hydroxide itself, are preferred smoke suppressants. Additionally, a mixture of aluminum hydroxide and magnesium hydroxide has been found to be particularly useful.

The amount of smoke suppressant employed in the invention may be varied within rather wide limits. for example the suppressant may comprise from 20 to 50 weight percent of the composition, preferably from 25 to 30 weight percent. Moreover, when a mixture of aluminum hydroxide and magnesium hydroxide is employed, the magnesium hydroxide preferably comprises no more than 10 weight percent of said mixture.

The low density filler useful in the composition may be selected from hollow microspheres (which may be either organic or inorganic), blowing agents and the like. These materials are characterized as having a low weight by volume. For example, this filler may have a weight by volume (or density) of less than about 0.6 g/cm$^3$ (preferably less than 0.5 g/cm$^3$). It also may be characterized as having low absorptivity of epoxide resin, and high compression strength. Further, they preferably are free flowing powders that preferably have a relatively homogeneous particle size. Generally they have diameters in the range of from 1 to 300 micrometers. Moreover, they preferably have a smooth outer surface rather than a rough outer surface. Although the latter may be used in the invention, they tend to make the composition more viscous and more difficult to handle.

Hollow microspheres useful in the invention may be selected from a wide variety of materials including, by way of example, glass, ceramic (including sol-gel derived), zirconia, metal, and polymeric microspheres. Preferably these microspheres are non-porous and have a diameter in the range of from about 20 to 100 micrometers and a density of less than about 0.5 g/cm$^3$, more preferably one in the range of from about 0.1 to 0.45 g/cm$^3$, and most preferably one of about 0.2 g/cm$^3$.

Specific examples of useful hollow microspheres are the glass microspheres disclosed in U.S. Pat. Nos. 4,279,632 and 2,978,340 the ceramic microspheres disclosed in U.S. Pat. Nos. 4,421,562 and 4,637,990; the zirconia-based ceramic microspheres disclosed in U.S. Pat. No. 4,772,511; the metal microspheres disclosed in U.S. Pat. No. 4,744,831 and the polymeric microspheres disclosed in U.S. Pat. Nos. 3,615,972, 3,472,798, 3,740,359, 3,945,956, and 4,075,138.

The quantity of the low density filler employed in the invention generally comprises from about 10 to about 25 weight percent of the composition. Preferably it comprises from about 15 to about 25 weight percent.

The bromine required by the composition of the invention may be supplied in a variety of ways. For example, the organic epoxide may contain a sufficient number of pendant bromine atoms to provide the requisite bromine content. However, it is generally more efficient to incorporate the bromine into the composition via a separate bromine-containing material. Generally these materials are polybrominated materials. Examples of useful bromine-containing materials are brominated epoxy resins and bromine-substituted derivatives of diphenylether, diphenyloxide and ethylenephthalimide. Mixtures of bromine-containing materials may also be used. Specific examples of useful bromine-containing materials include decabromodiphenyloxide, hexabromocyclododecane, tetradecabromodiphenyloxybenzene, and ethylene bis(tetrabromothalimide).

Numerous other materials may be added to the composition of the invention so as to achieve desired results. For example boron-containing compounds may be added to improve flame retardancy. Preferably these materials act in concert with the bromine-containing material to achieve this result. Moreover, the boron-containing materials give off water upon decomposition and provide added smoke suppression.

The amount of boron-containing compound employed in the invention can comprise up to about 10 weight percent of the composition. Preferably it comprises from 2 to 5 weight percent of the composition and more preferably about 3 weight percent. Additionally the weight ratio of the boron-containing compound to the bromine-containing material is preferably in the range of from about ½ to ¼, and more preferably the ratio is about ⅓.

Examples of useful boron-containing compounds include alkaline earth borates and metaborates, alkali metal borates and metaborates and boric acid or anhydride. Preferred boron-containing compounds are the alkaline earth borates and metaborates such as barium metaborate, calcium metaborate, zinc metaborate, and zinc borate. Mixtures of the boron-containing compounds may be used if desired.

Another material that may be advantageously employed is an organic phosphorous-containing compound. This material, which is typically added to aid in flame-retardancy, may comprise up to 10 weight percent of the composition. Preferably it comprises from 1 to 3 weight percent of the composition and more preferably from 1.5 to 2 weight percent. Above a level of 3 weight percent, the organic phosphorous-containing compound acts as a plasticizer with the result that mechanical properties of the cured composition begin to decrease. Above about 10 weight percent there is a dramatic reduction in such properties.

A noted above, a preferred composition of the invention not only is self-extinguishing but also possesses smoke suppression when hardened. One composition which provides these properties contains about 4 weight percent bromine, about 30 weight percent smoke suppressant, about 1.5 weight percent boron-containing compound, and about 1.5 weight percent organic phosphorous-containing compound.

Examples of useful organic phosphorous-containing compounds include alkyl phosphates, aryl phosphates, alkyl phosphonates, arylphosphonates and mixtures thereof.

Wetting agents may also be employed in the invention. These materials improve the mixability and hence the processability of the ingredients. They also can give the compositions improved handling characteristics. These materials are also often referred to as coupling agents, dispersing aids, antifoaming agents, and the like.

The amount of such materials used in the invention typically comprises up to about 5 weight percent of the composition, and preferably between about 0.8 and about 5 weight percent. Also, it is preferred that the combined weight of the organic phosphorous-containing compound and the wetting agent be between about 2 to 6 weight percent of the total weight of the inorganic components used.

Examples of useful wetting agents include titanates, silanes, zirconates, zircoaluminates and the like. Specific examples of such materials include gamma-glycidoxypropyltrimethoxy silane (Z-6040 from Dow Chemical Company), alkoxy silanes, amine-terminated silanes (A-1100 from Union Carbide), titanates such as Ken-React KR 55 from Kenrich Petrochemicals, Inc., zircoaluminates such as Cavco Mod APG from Cavedon Chemical Company, Inc. Also useful as a wetting agent are the high molecular weight epoxy-modified acrylates such as FLOWGEN M 75 from Bourigeaud.

Accelerators may also be used to increase the rate of the epoxide hardening reaction. Typically the accelerators are multifunctional materials which can also be classified as epoxide hardeners. Useful accelerators include tertiary amines, imidazoles, imidazole derivatives, imidazole-like compounds and the like. Specific examples of such materials have been identified above. Yet another useful accelerator is 2-(2-(2-methylimidazolyl)-ethyl)-4,6-diamino-s-triazine. Preferably the accelerator is employed at a level of from 0 5 to 10 parts per 100 parts by weight of the organic epoxide.

As can be seen, the compositions of the invention employ a wide variety of organic and inorganic ingredients. Although the ratios of these ingredients can be varied widely, it has been discovered that an easily handled one part composition is provided when the weight ratio of organic components to inorganic components is less than about 1.2/1 and preferably in the range of 0.5/1 to 1/1 and more preferably in the range of 0.8/1 to 1/1.

The compositions of the invention can be readily prepared by a number of techniques. For example, the various components may be added under ambient conditions to a suitable mixing vessel, such as a Mogul mixer. Preferably the liquid components are added first followed by the solid components. The low density filler is generally added last. The vessel is preferably cooled to prevent reaction of the components during preparation and to facilitate removal of any heat generated during manufacture. Preferably the composition is mixed at a temperature of less than 35° C. Additionally, slow mixing speeds are generally used to help prevent heat build-up in the mixer and to minimize breakage of any hollow microspheres employed. Mixing is continued until the components form a homogeneous mixture, after which time the composition is removed from the mixer.

The following examples further illustrate the present invention.

EXAMPLES 1–4

A series of one-part compositions according to the invention were prepared as described in the general procedure using the components listed in Table 1. All quantities are weight percent.

Large blocks of cured specimens of each composition were prepared by casting the compositions and hardening them at a temperature between 120° and 200° C. Smaller samples were then cut from each of the large blocks for further testing. The specimens for compressive strength measured 12.5 mm × 12.5 mm × 25 mm. The test was run by compressing the specimens on the 12.5 cm × 12.5 cm area. The specimens for the smoke tests measured 75 mm × 75 mm × 4 mm, and those for the flame tests measured 75 mm × 300 mm × 4 mm. The results of the various tests are given in Table 2.

TABLE 1

|  | 1 | 2 | 3 | 4 |
|---|---|---|---|---|
| Epoxide | 22.6 | 21 | 15.8 | 21 |
| Epoxy novolac (300 S 25 from Rutgers Chemical) |  |  |  |  |
| Hardener |  |  |  |  |
| $C^2$ | 22.6 | 21 | — | 21 |
| $C^3$ | — | — | 19 | — |
| Accelerator | 0.18 | 0.21 | 0.2 | 0.2 |
| 2-(2-(2-methyl-imidazolyl)-ethyl)-4,6-diamino-s-triazine |  |  |  |  |
| Bromine Source |  |  |  |  |
| Polybromo epoxy resin (50% by weight Br; Tradename and supplier) | — | — | 11 | — |
| Decabromodiphenyloxide | 4.8 | — | — | — |
| Ethylene-bis(tetrabromophthalate) | — | 6 | — | 4.5 |
| Smoke Suppressant |  |  |  |  |
| Aluminum Hydroxide | 29.9 | 30 | 31.7 | 28.5 |
| $C^4$ | — | — | 3.2 | — |
| Boron-Containing Material Zinc Borate | — | 1.5 | 1.6 | 1.5 |
| Organic Phosphorous-containing compound Dimethylmethyl phosphonate | 1.8 | 1.5 | — | 1.5 |
| Wetting Agent |  |  |  |  |
| Gamma-glycidoxypropyltrimethoxysilane | — | — | 1.6 | — |
| Zircoaluminate | 1.0 | 0.75 | — | 0.75 |
| Low Density Filler Glass Microspheres (A 20/1000 from 3M Company) | 15.4 | 18 | 15.8 | 21 |

TABLE 2

|  | 1 | 2 | 3 | 4 |
|---|---|---|---|---|
| Compression resistance (N/mm²) |  |  |  |  |
| at ambient temperature | 33 | 35 | 16 | 27 |
| at 80° C. | 15 | 27 | 7 | 20 |
| Non flaming - smoke density |  |  |  |  |
| at 90 seconds | 3 | 4 | 3 | 1 |
| at 240 seconds | 20 | 9 | 23 | 13 |

TABLE 2-continued

|  | 1 | 2 | 3 | 4 |
|---|---|---|---|---|
| During ignition | | | | |
| a) vertical, 60 seconds | | | | |
| burn rate (mm) | 50 | 66 | 36 | 104 |
| flame time (sec) | 0 | 0 | 0 | 0 |
| drip flame time (sec) | 0 | 0 | 0 | 0 |
| b) horizontal, 12 seconds | | | | |
| burn rate (mm) | 0 | 8 | 7 | 13 |
| flame time (sec) | 0 | 0 | 0 | 0 |
| drip flame time (sec) | 0 | 0 | 0 | 0 |
| Flaming - smoke density | | | | |
| at 90 seconds | 68 | 4 | 34 | 17 |
| at 240 seconds | 153 | 60 | 148 | 69 |
| Toxicity (240 seconds) | | | | |
| HCN (ppm) | 1 | 1 | 2 | 1 |
| CO (ppm) | 300 | 50 | 70 | 30 |
| NO + NO$_2$ (ppm) | 2 | 1 | 3 | 1 |
| SO$_2$ (ppm) | 10 | 0 | 0 | 0 |
| HF (ppm) | 0 | 0 | 0 | 0 |
| HCl (ppm) | 4 | 2 | 4 | 1 |

These tests were run according to the procedures described in ATS 1000.001. The toxicity tests for HF and HCl were run in a similar manner except that the gasses were passed into water and their concentration determined by the use of an electrode sensitive to each gas.

I claim:
1. A low density, fire-resistant epoxide composition comprising:
   (a) from 10 to 75 percent by weight of an organic epoxide compound having an epoxide functionality of at least 1;
   (b) from 1 to 25 percent by weight of an epoxide hardener;
   (c) from 20 to 50 percent by weight of a smoke suppressant;
   (d) from 10 to 25 percent by weight of a filler capable of reducing the density of said composition; and
   (e) from 1 to 10 percent by weight of an organic phosphorous-containing compound selected from the group consisting of alkyl phosphates, aryl phosphates, alkylphosphonates, arylphosphonates, and mixtures thereof,
   wherein said composition contains from about 3 to 10 weight percent bromine.

2. A low density composition according to claim 1 wherein said organic epoxide is selected from the group consisting of epichlorohydrins, alkylene oxides, alkenyl oxides, glycidyl esters, glycidyl ethers, epoxy novolacs, copolymers of acrylic acid esters of glycidol and copolymerizable vinyl compounds, and polyurethane polyepoxides.

3. A low density composition according to claim 2 wherein said organic epoxide has an epoxide functionality of from 2 to 4.

4. A low density composition according to claim 3 wherein said organic epoxide is selected from the group consisting of diglycidyl ethers of bisphenol A and epoxy novolacs.

5. A low density composition according to claim 4 wherein said organic epoxide comprises from 15 percent to 25 percent by weight relative to the total weight of said composition.

6. A low density composition according to claim 1 wherein said epoxide hardener is selected from the group consisting of amines, acid anhydrides, Boron trifluoride complexes, guanidines, and dicyandiamide.

7. A low density composition according to claim 6 wherein said epoxide hardener is an acid anhydride.

8. A low density composition according to claim 6 wherein the weight ratio of said epoxide to said epoxide hardener is in the range of from about 0.7/1 to 1.5/1.

9. A low density composition according to claim 1 wherein said smoke suppressant comprises a material which gives off water when heated.

10. A low density composition according to claim 9 wherein said smoke suppressant is selected from the group consisting of alkaline earth metal hydroxides, aluminum group hydroxides, boric acid, and mixtures thereof.

11. A low density composition according to claim 10 wherein said smoke suppressant is an aluminum group hydroxide.

12. A low density composition according to claim 10 wherein said smoke suppressant is selected from the group consisting of aluminum hydroxide and a mixture of aluminum hydroxide and up to 10 weight percent magnesium hydroxide.

13. A low density composition according to claim 10 wherein said smoke suppressant comprises from 25 percent to 35 percent by weight with respect to the total weight of said composition.

14. A low density composition according to claim 1 wherein said low density filler is hollow microspheres.

15. A low density composition according to claim 14 wherein said low density filler has a density of less than 0.6 g/cm$^3$.

16. A low density composition according to claim 14 wherein said hollow microspheres are selected from the group consisting of glass microspheres, ceramic microspheres zirconia microspheres, metal microspheres and polymeric microspheres.

17. A low density filler according to claim 16 wherein said microspheres have a density in the range of from 0.10 g/cm$^2$ to 0.45 g/cm$^3$.

18. A low density composition according to claim 17 wherein said microspheres have a diameter in the range of from about 20 to 100 micrometers.

19. A low density filler according to claim 18 wherein said microspheres are glass microballoons.

20. A low density composition according to claim 1 further comprising
   (f) up to 10 percent by weight of a boron-containing compound selected from the group consisting of alkaline earth borates and metaborates, alkali earth borates and metaborates, oxides of boron, and mixtures thereof.

21. A low density composition according to claim 20 wherein said boron-containing compound is selected from the group consisting of barium metaborate, calcium metaborate, zinc metaborate, zinc borate, and mixtures thereof.

22. A low density composition according to claim 1 wherein said phosphorous-containing compound comprises from 1% to 3% by weight with respect to the total weight of said composition.

23. A low density composition according to claim 1 wherein said phosphorous-containing compound comprises from 1.5% to 2% by weight with respect to the total weight of said composition.

24. A low density composition according to claim 1 further comprising
   (g) up to 5 percent by weight of a wetting agent.

25. A low density composition according to claim 1 having a weight ratio of organic compounds to inorganic compounds of 1.2 to 1 or less.

26. A low density composition according to claim 1 further comprising
   (i) up to 5 percent by weight of an accelerator for the curing of said epoxide.

27. A low density composition according to claim 1 wherein said bromine is provided by
   (j) from 1 to 20 percent by weight of a brominated material selected from the group consisting of brominated epoxy resins, decabromodiphenyloxides, hexabromocyclododecane, tetradecabromodiphenyloxybenzene, and ethylene bis(tetrabromophthalimide).

28. A low density, one part, self-extinguishing epoxide composition comprising
   (a) from 15 to 25 percent by weight of an organic epoxide compound having an epoxide functionality of from 2 to 4;
   (b) a liquid epoxide hardener present in a quantity sufficient to provide a weight ratio of said epoxide to said hardener in the range of from about 0.7/1 to 1.5/1;
   (c) from about 25 to 35 percent by weight of an inorganic hydroxide smoke suppressant;
   (d) from 10 to 25 percent by weight of an inorganic, filler capable of reducing the density of said composition;
   (e) up to about 10 percent by weight of an inorganic boron-containing compound;
   (f) from 1 to 10 percent by weight of an inorganic phosphorous-containing compound;
   (g) up to about 5 percent by weight of a wetting agent; wherein said composition comprises from about 3 to 10 weight percent bromine and has a weight ratio of organic compounds to inorganic compounds of 1.2 to 1 or less.

29. A void filling composition according to claim 1, having a density of 0.35 to 1.0 g/cm$^3$.

30. A void filling composition according to claim 1, having a compressive strength at room temperature above 15 N/mm$^2$ and above 7 N/mm$^2$ at 80° C.

31. A void filling composition according to claim 1 which, upon being hardened, has a non-flaming smoke density of less than 100 after 90 seconds and less than 200 after 240 seconds 32. A composition according to claim 1 which, upon being hardened, has a flaming smoke density of less than 100 after 90 seconds and less than 200 after 240 seconds.

33. A composition according to claim 1 which, upon being hardened, has
   i) a burn rate of less than 150 mm;
   ii) a flame time of less than 15 seconds; and
   iii) a drip flame time of less than 3 seconds; when said hardened composition is held in a vertical position and ignited for 60 seconds.

34. A composition according to claim 1 which, upon being hardened, has
   i) a burn rate of less than 200 mm;
   ii) a flame time of less than 15 seconds; and
   iii) a drip flame time of less than 5 seconds; when said hardened composition is held in a horizontal position and ignited for 12 seconds.

35. A composition according to claim 1 which, upon being hardened, has a non-flaming smoke density of less than 100 after 90 seconds and less than 150 after 240 seconds.

36. A composition according to claim 1 which, upon being hardened, has a flaming smoke density of less than 100 after 90 seconds and less than 150 after 240 seconds.

* * * * *

UNITED STATES PATENT AND TRADEMARK OFFICE
CERTIFICATE OF CORRECTION

PATENT NO. : 5,019,605
DATED : May 28, 1991
INVENTOR(S) : Patrice Jannic It is certified that error appears in the above-identified patent and that said Letters Patent is hereby corrected as shown below:

Col. 2, line 31, "g/cm" should read --$g/cm^3$--.

Col. 5, line 42, "for" should read --For--.

Col. 7, line 4, "A" should read --As--.

Col. 7, line 50, "05" should read --0.5--.

Col. 10, lines 32-33, "ceramic microspheres zirconia microspheres," should read --ceramic microspheres, zirconia microspheres,--.

Signed and Sealed this

Seventeenth Day of November, 1992

*Attest:*

DOUGLAS B. COMER

*Attesting Officer*  *Acting Commissioner of Patents and Trademarks*